United States Patent [19]

Conrads

[11] 4,254,724
[45] Mar. 10, 1981

[54] METHOD FOR THE DETERMINATION OF THE SWITCHING MOMENTS FOR SPECIAL FUNCTIONS OF AUTOMATIC SEWING-MACHINES

[75] Inventor: Hans Conrads, Tönisvorst, Fed. Rep. of Germany

[73] Assignee: Maschinenfabrik Carl Zangs Aktiengesellschaft, Krefeld, Fed. Rep. of Germany

[21] Appl. No.: 48,124

[22] Filed: Jun. 13, 1979

[30] Foreign Application Priority Data

Jun. 14, 1978 [DE] Fed. Rep. of Germany ....... 2825969

[51] Int. Cl.³ .............................................. D05B 19/00
[52] U.S. Cl. ............................. 112/262.1; 112/121.11; 112/277
[58] Field of Search ...................... 112/121.11, 121.12, 112/275, 277, 158 E, 262.1

[56] References Cited

U.S. PATENT DOCUMENTS

| 3,761,790 | 9/1973 | Daab | 112/275 |
| 4,104,978 | 8/1978 | Takahashi et al. | 112/277 |
| 4,143,605 | 3/1979 | Soeda et al. | 112/158 E |

Primary Examiner—Peter P. Nerbun
Attorney, Agent, or Firm—Martin A. Farber

[57] ABSTRACT

A method for the determination of the switching moments for special functions of automatic embroidery, straight-stitching-and sewing-machines with which the electrical signals which determine the switching moment are formed by logical switching operations in an electric or electronic control. The electrical signals fed to the control are produced by an angle coder (or a rotation pulse transmitter) which either is driven directly by the main drive shaft or indirectly by an auxiliary shaft; the angle coder delivers bit patterns, which bit patterns change constantly (or which pulse transmitter feeds pulses) from angle increment to angle increment of the main drive shaft (or which pulses are summed in a counter providing bit patterns at the output) and which bit patterns are compared in a logical switching operation control with other bit patterns representative of the different angular positions of the main drive shaft and being pre-programmed in the memory part of a memory/comparator; and upon bit pattern equality lead to the release of output signals for triggering of the special functions.

6 Claims, 2 Drawing Figures

METHOD FOR THE DETERMINATION OF THE SWITCHING MOMENTS FOR SPECIAL FUNCTIONS OF AUTOMATIC SEWING-MACHINES

The invention relates to a method for the determination of the switching moments for special functions of automatic embroidery, straight-stitching and sewing-machines with which the electrical signals which determine the switching moment are formed by logical switching operations in an electric and electronic control, respectively.

Automatically operating embroidery-, straight-stitching- and sewing-machines are known which use punch cards or punch tapes as information or data carriers for the embroidery-, straight-stitching- or sewing-patterns. The hole combinations of these data carriers, in addition to the data for the displacements of the embroidery goods, contain additional data concerning so-called special functions of the respective machines. For this purpose among other things are commands for skip stitches, for color change with multicolor machines or for the boring of holes in goods to be worked. These commands may be performed, however, only at certain angular positions of the drive shaft of the embroidery-, straight-stitch or sewing-heads, and in addition must be isolated or at certain other angular positions in order to prevent mechanical damage to the machines.

For this purpose with the known embroidery-, straight-stitching- and sewing-machines, actuation cams or lifters which are adjustable inside of the needle heads are located either on the main drive shaft or on an auxiliary drive shaft driven by this drive shaft, which actuation cams actuate control contacts at certain angular positons, the control contacts in turn making possible the performance of the special function commands. Mechanical switching contacts, electromagnetic, contactless pulse transmitters, inductive contactless pulse transmitters as well as photo optical pulse transmitters and photoelectric devices or reflection photoelectric devices are known as such type of control contacts.

Depending upon the type and number of the special functions up to ten and more control contacts are necessary, for example if the special functions comprise the release of the registration for upper and lower thread breaking, the release and ending of the skip stitch functions, the release of the color change command and the release of the command for the boring. The release of the signals coming from the control contacts are combined or switched in an electrical or electonic control such that with the special function commands which come from the punch cards or punch tapes, an execution of command only occurs when both signals arise simultaneously.

These known embodiments have dirrerent disadvantages. Particularly as a consequence of the multiplicity of connection lines an increased danger of error functions exist by disturbance or interference pulses. Furthermore, expensive and time consuming adjustment or alignment work are required with the adjustment of the actuation cams. Finally there is a reduced reliability of operation by the multiplicity of control contacts.

It is an object of the invention to produce a method for determination of the switching moments for special functions of automatic embroidery-, straight-stitch and sewing-machines, which avoids the disadvantages of the known methods and guarantees of high operational reliability with the simplest construction.

The solution of this object is characterized by the invention on the one hand in the manner that the electrical signals fed to the control are produced by an angle coder, which coder either is driven directly by the main drive shaft or indirectly by an auxiliary shaft and the angle coder delivers bit patterns, which bit patterns change constantly from angle increment to angle increment of the main drive shaft and which bit patterns are compared in a logical switching operation control with other bit patterns, the latter being pre-programed in the memory part of a memory/comparator, the latter bit patterns being representative of the different angular postions of the main drive shaft, and upon bit pattern equality lead to the release of output signals for the triggering or actuation of the special functions.

On the other hand the preceding task is solved by the invention in the manner that the electrical signals which are fed to the control are produced by a rotation-pulse transmitter which is driven either directly from the main drive shaft or indirectly from an auxiliary drive shaft and which feeds electrical pulses from angle increment to angle increment of the main drive shaft, the pulses being summed in an electrical counter and appearing at the outputs of the counter as bit patterns, which bit patterns are compared in a logical switching control with other bit patterns, the latter bit patterns being preprogramed in the memory part of a memory/comparator, which latter bit patterns are representative of different angular postitons of the main drive shaft, and upon bit pattern equality lead to the release of output signals for the triggering of special functions.

From both solutions in accordance with the objective of the invention, the use of the angle coding offers the greatest security against disturbance or interference pulses, since depending upon the position of the main drive shaft, an exactly defined bit pattern is emitted and a disturbance or interference pulse can always change only the bit pattern occurring at the moment, since the following bit pattern again represents a true image or picture of the changed angle of the machine shaft. In order to avoid the disturbance or fault of a single bit pattern leading possibly to an error function in the course of the machine program, according to the invention a parity-bit can be added to another measure known from data transmission technology can be taken.

During the use of an angular coder, depending upon the degree of the angle resolution and code which is used, a larger number of connection lines is to be wired between the angle coder and the control device (with a resolution up to one angle degree, for example, nine bits and consequently ten connection lines are required); alternately the use of a rotational pulse transmitter is possible. Such a device which is driven from the main drive shaft of the machine emits one electrical pulse respectively each rotational angle-increase. The number of pulses of one rotation of the drive shaft in this manner is a measure for the level of the resolution. Independently of this resolution, always only two connection lines are necessary between the pulse transmitter and the switching operation control, so that with the use of a rotational pulse transmitter the smallest number of connection lines is achieved.

A certain susceptability of the rotational pulse transmitters to disturbance or interference pulses can be eliminated by using a pulse transmitter which also emits a negative pulse simultaneously with a positive pulse.

These inverse pulses are then led by means of separate lines to the switching operation control. In this case four connection lines are required for both pulses. For these lines to be applied simultaneously with inverse disturbance pulses is improbable. At the receiving location of the switching operation control, in accordance with the invention both arriving pulses are processed into a single pulse via an AND gate, negating that input of the AND gate which is applied with the negative pulse.

By means of a suitable coding of the angle coder, and respectively, by formation of the rotational pulse transmitter such that for example two pulses are emitted, which pulses are offset by 90 angular degrees, in accordance with the invention a rotational direction recognition is achieved, which, in the case of a rotational direction which is damaging to the machine, can be used for immediately stopping the machine.

With the invention it is finally proposed that the rotation pulse transmitter emits an additional pulse in the zero position of the main drive shaft, which additional pulse is processed in a logical switching operation control for setting back the summing electrical counter as well as for synchronization of other operations.

In the drawing two embodiment examples of a device for performing the methods in accordance with the invention are illustrated, and indeed:

Figure 1:
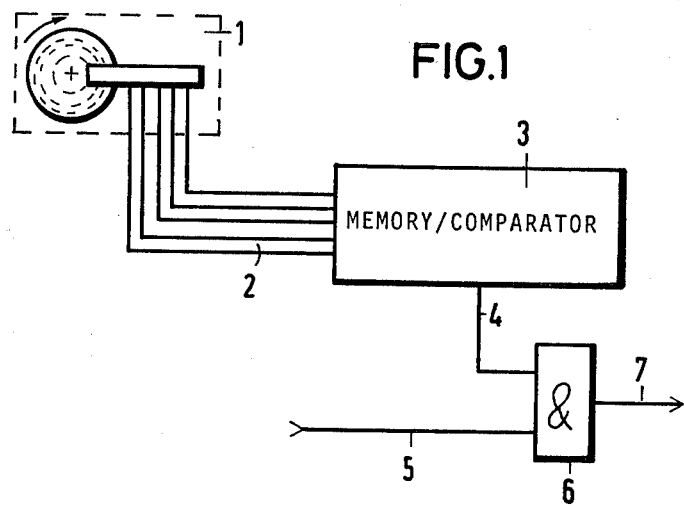
FIG. 1 shows a block circuit diagram with the use of an angle coder.
Figure 2:
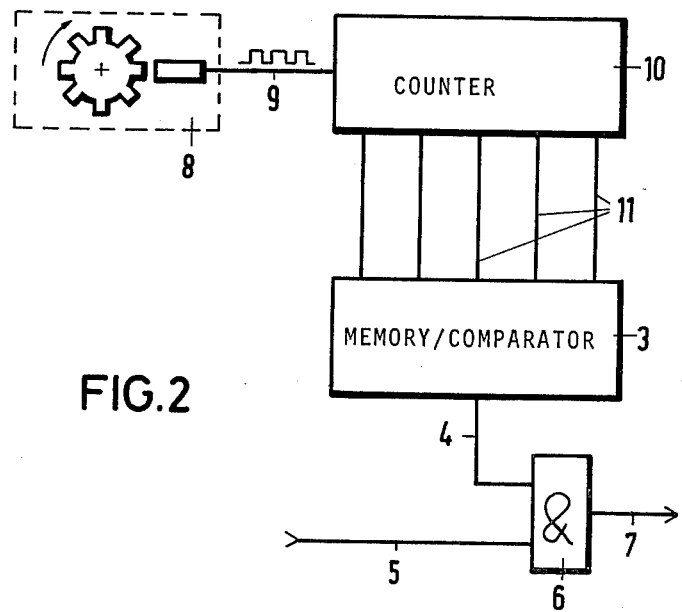
FIG. 2 shows a corresponding block circuit diagram with the use of a rotational pulse generator.

The embodiment according to FIG. 1 shows an angle coder (absolute position shaft encoder) 1 which is driven either directly from the main drive shaft (which main drive shaft is not illustrated in the drawing) of the embroidery-, straight-stitch- or sewing-machine or is driven indirectly from an auxiliary shaft. The electrical signals coming from the angle coder 1 are fed by means of lines 2 to a combined memory/comparator 3 and here are constantly compared with previously stored electrical values. Upon equality in all values an output line 4 receives an output signal. If at this moment a signal also is transmitted in the line 5 which is supplied with the information on the punch card or the punch tape, then both signals are processed in an AND gate 6 into a single output signal, which single output signal is fed via a control line 7 for the control of the embroidery-, straight-stitching- or sewing-machine and there is processed for the execution of special functions, e.g. of a skip stitch. With the embodiment example illustrated in FIG. 2 instead of the angle coder there is provided a rotational pulse transducer or transmitter 8 which either is driven directly from the non-illustrated main drive shaft of the embroidery-, straight-stitching- or sewing-machine or directly by means of an auxiliary shaft.

This rotational pulse transmitter 8 is connected via a line 9 with an electronic counter 10 so that the electrical signals coming from the rotational pulse generator 8 are fed to this counter and are summed here. By means of connection lines 11 this electrical counter 10 stands in connection with the memory/comparator 3, the latter corresponding to the corresponding component of the embodiment illustrated in FIG. 1. In this memory/comparator 3 the electrical potentials of the connection lines 11 are constantly compared with the values which were previously stored in the storage or memory part. If during this comparison there is an equality of potential on all bits, then the storage/comparator 3 emits a signal via the output line 4.

If at this moment in the line 5 which receives information from the perforated band, and respectively, from the perforated tape, likewise an output signal arises, for example a command for the execution of a skip stitch, then the signals from the output line 4 and from the line 5 are processed in the AND gate 6 into an individual output signal. This output signal is fed over the control line 7 to a part (not illustrated in the drawing) of the machine control and is processed there for the final execution of the special function, in the present case of the skip stitch.

As an electronic counter 10, dual counters as well as binary coded decimal counters are suitable, which operate either in forward drive or reverse drive. The outputs of the counter 10 indicate a bit pattern after each received pulse, which bit pattern is to be exactly coordinated or associated with a certain angular position of the main drive shaft.

With both embodiment examples the bit patterns which are supplied from the angle coder 1, or respectivly, the patterns (to be designated as actual bit patterns) at the outputs of the counter 10 are compared with other patterns (to be designated as nominal or desired value bit patterns) by means of the logical switching operation control. Only during equality of the bit patterns does the control supply an output signal. The nominal value-bit patterns which have been entered or fed previously to the electronic memory part of the memory/comparator 3 correspond to exactly defined angular postitions of the main drive shaft. They are calculated only once with consideration of the resolution or definition of the angle degree.

If for example the resolving power or resolution capability amounts to one angular degree, this means that with each main drive shaft rotation, the rotation pulse transmitter (incremental position shaft encoder) 8 emits 360 pulses. If it emits 60 pulses thus the rotational angle of the main drive shaft amounts to 60 angular degrees. The bit pattern which now arises at the outputs of the electronic counter 10 will have for example the form HHHHLL with the use of a dual code.

If now it is intended to trigger a switching operation at 60 angular degrees of the main drive shaft, for example to introduce a skip stitch, then an equal bit pattern is programmed in the memory part of the memory/comparator 3. This memory part can be formed such that simultaneously it operates as a bit-comparator and consequently is provided even with input connections or terminals which correspond with the outputs of the electronic counter, which counter supplies the actual value-bit patterns. With equality of the two bit patterns the comparator part emits an output signal which is processed for the execution of the skip stitch when simultaneously from the punch card or respectively from the punch tape which control the embroidery-, straight-stitch or sewing-machines, there arises the command for the performance of a skip stitch.

I claim:

1. A method for the determination of the switching moments for special functions of automatic embroidery, straight-stitching and sewing-machines by which the electrical signals which determine the switching moment are formed by logical switching operations in an electric and electronic control, respectively, comprising the steps of producing electrical signals to be fed to the control by an angle coder, driving the angle coder either directly by rotating a main drive shaft or indirectly by rotating an auxiliary shaft, delivering bit patterns by means of the angle coder, and changing the bit patterns constantly from angle increment to angle increment of the main drive shaft, pre-programing other bit patterns in a memory part of a memory/comparator, the latter bit patterns being representative of the different angular positions of the main drive shaft, comparing the first-mentioned bit patterns in a logical switching operation control with the other bit patterns, and upon bit pattern equality releasing output signals for triggering the special functions.

2. A method for the determination of the switching moments for special functions of automatic embroidery, straight-stitching and sewing-machines by which the electrical signals which determine the switching moment are formed by logical switching operations in an electric and electronic control, respectively, comprising the steps of producing electrical signals to be fed to the control by a rotation pulse transmitter, driving the rotation pulse transmitter directly by rotating a main drive shaft or indirectly by rotating an auxiliary drive shaft, feeding electrical pulses from angle increment to angle increment of the main drive shaft via said pulse transmitter, summing the pulses in an electrical counter, providing bit patterns at outputs of the counter, pre-programming other bit patterns in the memory part of a memory/comparator, which other bit patterns are representative of different angular positions of the main drive shaft, comparing the first-mentioned bit patterns in a logical switching control with the other bit patterns, upon bit pattern equality releasing output signals for triggering the special functions.

3. The method according to claim 1, further comprising the steps of providing a coding of the angle coder and with another bit pattern pre-given in the memory/comparator, and by performing a logical switching operation control, recognizing the rotary direction of the main drive shaft, in the case of recognition of a rotary direction damaging the machine, immediately stopping the machine.

4. The method according to claim 2, comprising the steps of simultaneously supplying two pulses from the rotation pulse transmitter from angle increment to angle increment of the main drive shaft, which two pulses are inverse relative to one another, one of the pulses constituting a negative pulse, processing the two pulses in a logical switching operation via an AND gate into a single pulse, with negating an input of the AND gate which is applied with the negative pulse.

5. The method according to claim 2, further comprising the steps of supplying two pulses from the rotation pulse transmitter from angle increment to angle increment of the main drive shaft, such that the second pulse is phase displaced compared to the first pulse, processing the second pulse in a logical switching operation together with the first pulse into a rotation direction recognition of the main drive shaft, in the case of a recognition of a rotational direction harming the machine, immediately stopping the machine.

6. The method according to claim 2, further comprising the steps of emitting an additional pulse by the rotation pulse transmitter in the zero position of the main drive shaft, processing the additional pulse in a logical switching operation for setting back the summing electrical counter as well as for synchronizing of other operations.

* * * * *